United States Patent [19]

André

[11] 4,437,633
[45] Mar. 20, 1984

[54] ELASTIC FASTENING CLAMP FOR ROUND BARS OR CABLES OF VARIOUS DIAMETERS

[75] Inventor: Guy André, Seyssinet-Pariset, France

[73] Assignee: A. Raymond, Lorrach, Fed. Rep. of Germany

[21] Appl. No.: 325,190

[22] Filed: Nov. 27, 1981

[51] Int. Cl.³ .............................................. F16L 3/22
[52] U.S. Cl. .................. 248/68 R; 248/74 A
[58] Field of Search ............... 248/74 R, 74 A, 74 B, 248/73, 71; 24/257; 308/2 A

[56] References Cited

U.S. PATENT DOCUMENTS

| 3,019,500 | 2/1962 | Duffin et al. | 24/257 |
| 3,944,177 | 3/1976 | Yoda | 248/74.3 |
| 4,023,758 | 5/1977 | Yuda | 248/74.5 |

FOREIGN PATENT DOCUMENTS

| 251988 | 5/1966 | Austria | 248/68 R |
| 2385966 | 12/1978 | France | 248/74.3 |
| 2454012 | 4/1979 | France | 248/74.3 |
| 1338325 | 11/1973 | United Kingdom | 248/68 R |

Primary Examiner—William H. Schultz
Assistant Examiner—Ramon O. Ramirez
Attorney, Agent, or Firm—Finnegan, Henderson, Farabow, Garrett & Dunner

[57] ABSTRACT

A fastening clamp which includes a bottom plate joining two upstanding side walls. A flexible holding tongue extends downwardly from the upper or free end of each side wall toward the center of the clamp. A flexible support wall extends downwardly from the upper portion of each side wall also toward the center of the clamp. The lower rims of the support walls terminate approximately centrally between the lower or holding rims of the tongues and the bottom plate. A groove is formed in the center of the bottom plate extending parallel to the support walls and side walls.

4 Claims, 6 Drawing Figures

ELASTIC FASTENING CLAMP FOR ROUND BARS OR CABLES OF VARIOUS DIAMETERS

BACKGROUND OF THE INVENTION

The invention concerns an elastic fastening clamp which is operable to secure round bars, in particular tubulures or cables of various diameters, to a support plate. The fastening clamp essentially comprises two side walls joined by a bottom plate to form a generally U-shape. The side walls are provided at their free ends with flexible holding tongues which are integral therewith and form an approximate V-shape with the side walls extending downwardly toward the center of the fastening space which is formed by the side walls and the bottom plate. The side walls each are provided with a flexible support wall which angles downwardly from the upper portion of and forms an approximate V-shape with the respective side walls. The support walls laterally bound the fastening space and their ends terminate approximately centrally between the lower ends or holding rims of the holding tongues, and the bottom plate.

The flexible holding tongues offer the advantage that they can be easily spaced apart when a bar is forced into the fastening space, whereupon they elastically return to their initial position so that their holding rims face radially against the surface of the bar. In addition, the holding tongues are loaded in comparison against attempted removal of the bar. Thus, the holding force of this clamp substantially exceeds the force required in assembly, that is, the force required to press a round bar into the clamp.

The flexible support walls provide that the bars are reliably clamped in place from both sides and the support walls easily adapt to various diameters of bars.

The clamp of the present invention is useful for a given range of bar or cable diameters. However, clamps of this type incur a drawback in that where small cable diameters are concerned, much of the fastening space is not used, namely the space between the holding rims of the holding tongues and the bottom plate.

SUMMARY OF THE INVENTION

It is an important object of the invention to so structure the fastening clamp that it better utilizes the fastening space.

This is achieved by providing a groove at the center of the bottom plate which is parallel to the support walls and side walls. The groove is operable to laterally support the smallest diameter bar used. By this groove, the range of application of the fastening clamp is expanded to such an extent that even two small diameter bars can be held in place one above the other in the clamp. The only requirement is that the combined diameters of the bars or cables not exceed the maximum admissible bar diameter for this clamp. Where two bars are inserted in the clamp, the lateral support walls are used as holding tongues for the bottom bar.

In order to ensure its lateral support function, the groove is of such depth that the smallest diameter bar is supported with at least one fourth of its circumference within the groove.

The groove may be round or it may be formed of two oblique support surfaces arranged mutually symmetrically to each other and together surrounding an angle alpha ($\alpha$) of about 90°, whereby small diameter bars are retained as if in so-called "prisms". This kind of groove structure is especially suitable when the clamp is constructed of metal, because then small tongues need to be stamped out of the bottom plate and bent upwardly to form the groove.

Two illustrative embodiments of the fastening clamp are shown in the drawing and will be discussed more comprehensively below.

IN THE DRAWINGS

DETAILED DESCRIPTION OF THE PREFERRED EMBODIMENTS

Figure 1:
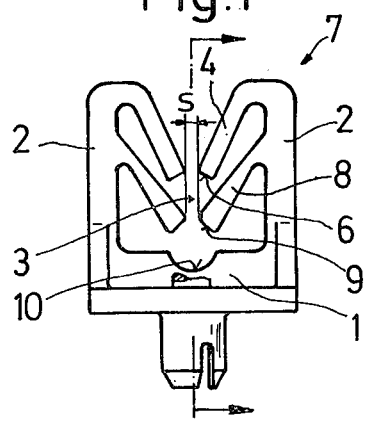
FIG. 1 is a front view of the clamp of the present invention.

The clamps shown in the drawings are used to hold round bars, such as tubulures or cables of various diameters, in place on support plates, in particular on automobile body sheet metal. In the illustrated embodiments, the fastening clamp is constructed of a hard-elastic plastic. However, it is to be understood that the clamp of this invention may also be constructed of sheet metal or other suitable material.

As shown in FIG. 1, the fastening clamp of this invention comprises a bottom plate 1 and two side walls 2 joined to said bottom wall to form a generally U-shape. The side walls 2 are provided at their free (upper) ends 7 with flexible holding tongues 4 integrally joined therewith and angled downwardly toward the center of the fastening space 3 formed by the bottom plate 1 and side walls 2. The holding tongues 4 form a generally V-shape with their respective side walls and approach one another and are spaced by a gap "s" at the center of the fastening space 3. Gap "s" is less than the smallest diameter of round bar to be used therewith. Thus, when a round bar 5 is inserted into the fastening space 3, as shown in FIG. 4, the holding tongues 4 are forced apart but elastically return to their initial positions the moment the bar 5 has passed the widened gap "s". The holding tongues 4 then will rest with their holding rims 6 against the surface of the bar 5 about radially to said bar. Thus, it is practically impossible of the cable 5 to detach itself from the clamp (see FIGS. 3-5).

In order that there be reliable fastening of the round bars 5 even in the case of different diameters, two flexible support walls 8 are provided, one each extending in V-shape fashion from the upper area of a respective one of the side walls 2 downwardly towards the bottom of the fastening space 3. The support walls 8 laterally support the pressed-in round bar 5. The lower rims 9 of the support walls 8 terminate approximately centrally between the holding rims 6 of the flexible tongues 4 and the bottom plate 1 and are spaced apart also by the gap "s". The wall thickness of the support walls 8 is somewhat less near the side walls 2 than at the center of the fastening space 3 so that when the round bar 5 is pressed into place, the support walls 8 can yield easily without exerting pressure on the side walls 2.

In accordance with the invention, a groove 10 is provided at the center of the bottom plate 1 and extends parallel to the support walls 8 and side walls 2. The groove 10 has a curvature corresponding approximately to the surface of the smallest diameter round bar 5 to be used with the clamp. The groove 10 has a depth such that the smallest diameter bar 5 useful with this clamp and resting against the bottom plate 1 has at least one fourth of its circumference in the groove 10.

Figure 2:
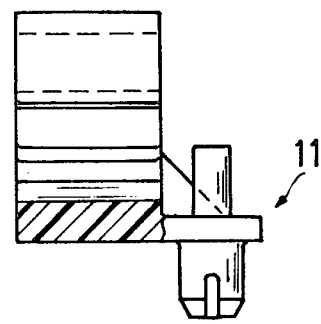
FIG. 2 is a sectional view of the clamp of FIG. 1 taken along the line 2—2.

As shown in FIG. 2, a rivet 22 having a lower expanding part is integrally formed with the bottom plate 11 to fix the fastening clamp to a support plate 12 (See also FIG. 4). Obviously any other suitable connecting means can also be used to fix the clamp to the support plate.

Figure 3:
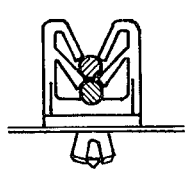
FIG. 3 is a view of the clamp of the present invention similar to FIG. 1 shown to a reduced scale and mounted on a support plate and holding two small diameter bars.
Figure 4:
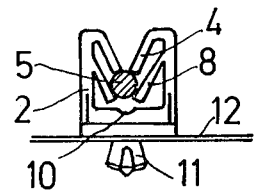
FIG. 4 is a view similar to FIG. 3 showing a bar of average diameter therein.
Figure 5:
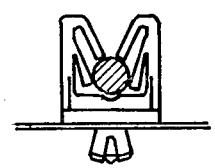
FIG. 5 is a view similar to FIGS. 3 and 4 and showing a bar of maximum diameter therein.

FIGS. 3 through 5 show the various applications possible for the fastening clamp. FIG. 3 shows a clamp holding two small diameter bars. FIG. 4 illustrates a single bar being held in the clamp. FIG. 5 shows a single bar of the largest possible diameter being held.

Figure 6:
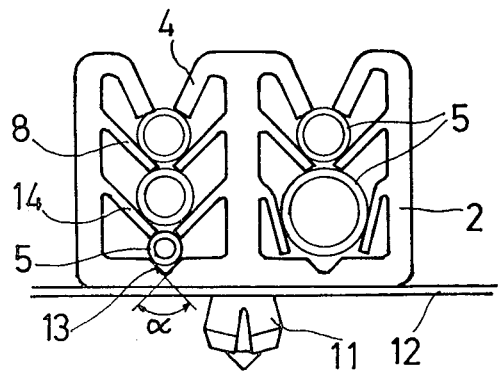
FIG. 6 shows another illustrative embodiment of the clamp of this invention.

FIG. 6 illustrates the double clamp and shows the groove 10 being formed by two plane support surfaces 13 which are symmetrical and form an angle (α) of about 90°. The lower tubulure 5 shown in the left part of the double clamp is supported by the surfaces 13 as if in a prism. This double clamp is equipped on each side with two additional support walls 14, whereby this embodiment makes it possible to hold in place three small diameter bars, or one small diameter bar and one large diameter bar one on top of the other.

I claim:

1. An elastic fastening clamp operable to secure round bars of various diameters onto a support plate, comprising two side walls joined together in U-shaped manner by a bottom plate, said side walls being provided at their free ends with a flexible holding tongue integral therewith and angled downwardly therefrom towards the center of a fastening space formed by the bottom plate and side walls, said tongues each being formed with a holding rim at the lower end thereof, each of said side walls being provided with a flexible support wall angled downwardly from the upper area of the side walls, said support walls having lower rims terminating approximately centrally between the holding rims of the tongues and the bottom plate, the adjacent holding rims of the tongues and the adjacent lower rims of the support walls being normally spaced apart from one another and defining a gap at the center of the holding space, said bottom plate having a relatively flat upper surface and provided with a groove at the center thereof parallel to the side walls, said groove being substantially less in width than the spacing between the side walls and wider than said gap and operable to laterally support a plurality of different sized round bars to be held in place in said clamp.

2. A fastening clamp as claimed in claim 1, characterized in that the groove supports the smallest diameter round bar over at least one fourth of its circumference.

3. A fastening clamp as claimed in claims 1 or 2, characterized in that the groove is formed by two support surfaces obliquely arranged in the bottom plate and subtending between them an angle of about 90°.

4. A fastening clamp as claimed in claim 1, characterized in that the wall thickness of the central support walls decreases toward the side wall.

* * * * *